US00RE37220E

(19) United States
(12) Reissued Patent
Rapisarda et al.

(10) Patent Number: US RE37,220 E
(45) Date of Reissued Patent: Jun. 12, 2001

(54) MODULE TO PROVIDE INTERMITTENT LIGHT WITH MOVEMENT

(76) Inventors: Carmen Rapisarda, 21211 Wisteria St., Apple Valley, CA (US) 92308; Mark R. Goldston, 3347 Clerendon Rd., Beverly Hills, CA (US) 90210; Jon L. Bemis, Adidas Asia/Pacific Limited, Hai Thanh Office Center 2 Thi Sach Street, Dist. #1, Ho Chi Minh City (VN)

(21) Appl. No.: 08/994,136

(22) Filed: Dec. 19, 1997

(Under 37 CFR 1.47)

Related U.S. Patent Documents

Reissue of:
(64) Patent No.: 5,477,435
Issued: Dec. 19, 1995
Appl. No.: 08/035,314
Filed: Mar. 22, 1993

(51) Int. Cl.[7] ..... F21V 21/08
(52) U.S. Cl. ..... 362/189; 362/103; 362/201; 362/200; 36/137
(58) Field of Search ..... 362/253, 189, 362/103, 200, 201, 800, 394, 205; 36/137

(56) References Cited

U.S. PATENT DOCUMENTS

| | | |
|---|---|---|
| 1,597,823 | 8/1926 | Randolph . |
| 1,933,243 | 10/1933 | De Merolis et al. . |

(List continued on next page.)

FOREIGN PATENT DOCUMENTS

| | | |
|---|---|---|
| 2608485 | 9/1977 | (DE) . |
| 2838770 | 3/1980 | (DE) . |
| 3824352 | 2/1990 | (DE) . |
| 0121026 | 10/1984 | (EP) . |
| 335467 | 10/1989 | (EP) . |
| 2556190 | 6/1985 | (FR) . |
| 2675025 | 10/1992 | (FR) . |
| 1058466 | 2/1967 | (GB) . |
| WO 93/11681 | 6/1993 | (WO) . |

*Primary Examiner*—Y. Quach

(57) ABSTRACT

An improved module of the type having a light emitting diode and a wafer battery held in the case. The module has a case having a floor, a lighted end and an LED supporting cavity at the lighted end. An LED is supported in the case so that its lower conductor is adjacent the floor and its upper conductor is supported in a cantilevered manner from the transparent lens portion of the LED. A wafer battery having a positive and a negative terminal on each side thereof, is positioned so that one of its terminals continuously contacts the lower conductor of the LED and the upper conductor is positioned so that it is spaced from the other terminal of the wafer battery. A weight member is held above the upper terminal of the LED and the weight member has sufficient weight so that it will move the upper conductor downwardly when the weight is moving downwardly by inertia but will not have sufficient weight to move the upper conductor into contact with the wafer battery when the module is at rest. The module is thus intermittently lighted when the case is moved up and down but is turned off when the case is at rest.

16 Claims, 2 Drawing Sheets

U.S. PATENT DOCUMENTS

| | | |
|---|---|---|
| 2,572,760 | 10/1951 | Rikelman . |
| 2,634,407 | 4/1953 | Johnson . |
| 2,671,209 | 3/1954 | Habib . |
| 2,671,847 | 3/1954 | Lerch . |
| 2,816,284 | 12/1957 | Campanell . |
| 2,849,819 | 9/1958 | Murphy et al. . |
| 2,931,893 | 4/1960 | Arias et al. . |
| 2,959,892 | 11/1960 | Johnson . |
| 2,976,622 | 3/1961 | Shearhouse . |
| 3,008,038 | 11/1961 | Dickens et al. . |
| 3,053,949 | 11/1962 | Johnson . |
| 3,070,907 | 1/1963 | Rocco . |
| 3,359,411 | 12/1967 | Schwartz . |
| 3,564,232 | 2/1971 | Ellerbe . |
| 3,731,022 | 5/1973 | Loftus ..... 200/61.49 |
| 3,800,133 | 3/1974 | Duval . |
| 3,893,247 | 7/1975 | Dana, III . |
| 3,946,505 | 3/1976 | Dana, III . |
| 4,014,115 | 3/1977 | Reichert . |
| 4,020,572 | 5/1977 | Chiaramonte, Jr. . |
| 4,128,861 | 12/1978 | Pelengaris . |
| 4,130,951 | 12/1978 | Powell . |
| 4,158,922 | 6/1979 | Dana, III . |
| 4,231,079 | 10/1980 | Heminover . |
| 4,253,253 | 3/1981 | McCormick . |
| 4,350,853 | 9/1982 | Ganyard . |
| 4,412,205 | 10/1983 | Von Kemenczky . |
| 4,701,146 | 10/1987 | Swenson . |
| 4,848,009 | 7/1989 | Rodgers . |
| 4,897,947 | 2/1990 | Kass Pious . |
| 5,052,131 | 10/1991 | Rondini . |
| 5,188,447 | 2/1993 | Chiang et al. . |
| 5,235,761 | 8/1993 | Chang . |
| 5,285,586 | 2/1994 | Goldston et al. . |
| 5,303,131 | 4/1994 | Wu . |
| 5,303,485 | 4/1994 | Goldston et al. . |
| 5,343,190 | 8/1994 | Rodgers . |
| 5,357,697 | 10/1994 | Lin . |
| 5,406,724 | 4/1995 | Lin . |
| 5,408,764 | 4/1995 | Wut . |
| 5,419,061 | 5/1995 | Barrocas . |
| 5,422,628 | 6/1995 | Rodgers . |
| 5,457,900 | 10/1995 | Roy . |
| 5,461,188 | 10/1995 | Drago et al. . |
| 5,465,197 | 11/1995 | Chien . |
| 5,477,435 | 12/1995 | Rapisarda et al. . |
| 5,495,682 | 3/1996 | Chen . |
| 5,500,635 | 3/1996 | Mott . |
| 5,502,903 | 4/1996 | Barker . |
| 5,550,721 | 8/1996 | Rapisarda . |
| 5,644,858 | 7/1997 | Bemis . |

MODULE TO PROVIDE INTERMITTENT LIGHT WITH MOVEMENT

Matter enclosed in heavy brackets [ ] appears in the original patent but forms no part of this reissue specification; matter printed in italics indicates the additions made by reissue.

BACKGROUND OF THE INVENTION

The field of the invention is footwear, and the invention relates more particularly to footwear with molded shoes of the type generally referred to as "gym shoes" and furthermore, of the type of "gym shoe" that has a light in the sole thereof.

Gym shoes, or more specifically basketball, jogging, and tennis shoes, have become a large selling product particularly to the youth. Since many such shoes are often worn at night, ways are needed to improve visibility for safety. Various designs have been devised for providing a bright light in the sole of a shoe. Applicant's co-pending application, Ser. No. 07/806,925 filed Dec. 11, 1991, shows a design of intermittently lighted shoe which utilizes the weight of the wearer to move down a conductor of a light-emitting diode into contact with a wafer battery. While this design is very satisfactory for most uses, a design which does not require the wearer to depress and deform the lighted module, would be useful. Furthermore, more of an on and off flashing action to the light-emitting diode would provide a somewhat more flashy appearance which is beneficial from a marketing as well as a safety standpoint, by providing a more visible signal.

SUMMARY OF THE INVENTION

It is an object of the present invention to provide a gym shoe which has the ability to emit light as the shoe is moved during walking and running.

The present invention is for an improved module for use in the sole of a shoe which has a light-emitting diode and a wafer battery held in a case. A light-emitting diode is supported in the case and has an upper conductor and a lower conductor. The lower conductor is in continual contact with one of the terminals of a wafer battery and the second conductor of the LED is positioned just above the other terminal of the wafer battery. A weight member is positioned above the upper terminal of the LED and when at rest, is not heavy enough to move the conductor downwardly into contact with the terminal of the wafer battery. However, when the shoe is moved downwardly and stopped, the inertia of the weight member has sufficient force to complete the contact and turn on the LED. The effect is a flashing light which flashes on as the shoe is being moved but remains off when the shoe is at rest. Preferably the weight member is a hinged weight member.

BRIEF DESCRIPTION OF THE DRAWINGS

FIG. 5 is a cross-sectional view analogous to FIG. 4 except that the LED is on.

DESCRIPTION OF THE PREFERRED EMBODIMENTS

Figure 1:
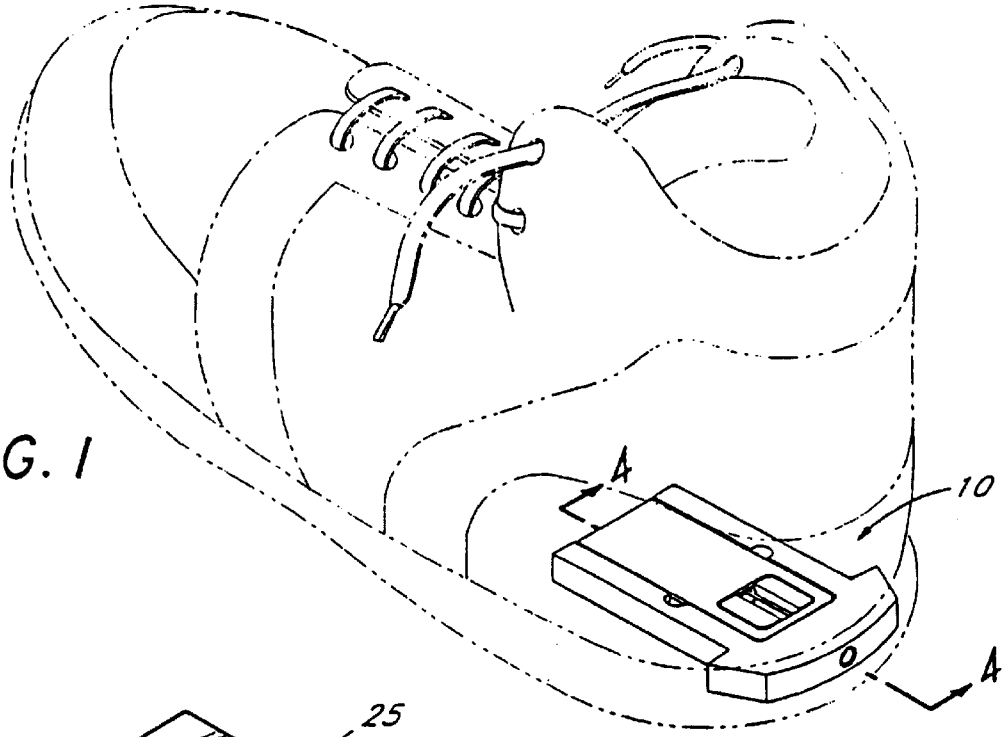
FIG. 1 is a perspective view of the module of the present invention held in the sole of a shoe which is shown in phantom view.
Figure 2:
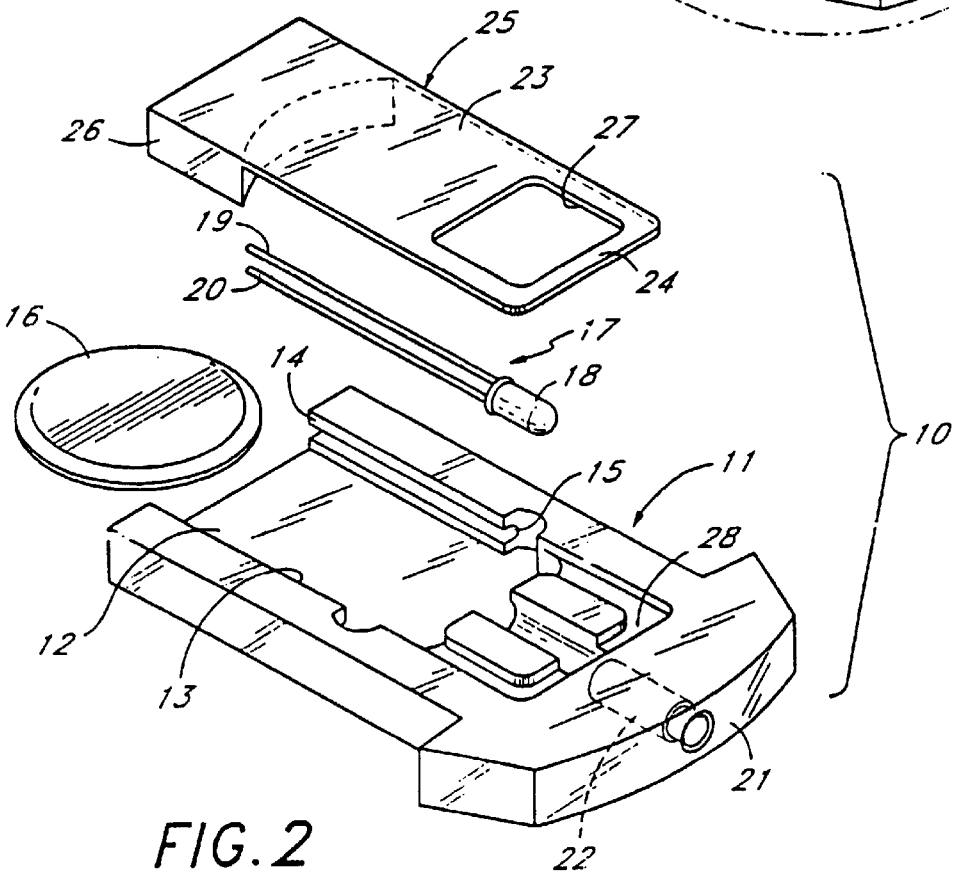
FIG. 2 is an exploded perspective view of the module of FIG. 1.
Figure 3:
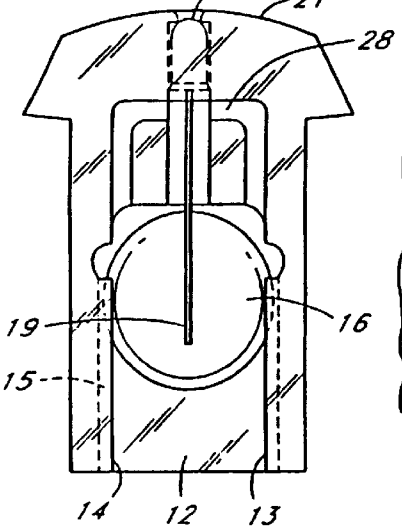
FIG. 3 is a plan view thereof.

An improved module of the type having a light emitting dime and a wafer battery held in a case is shown in FIG. 1 and indicated generally by reference character 10. Module 10 has a case 11 which has a floor 12 and a pair of walls 13 and 14. Walls 13 and 14 each have a groove and the groove in wall 14 is indicated by reference character 15. These grooves hold a wafer battery 16 as shown best in FIG. 3.

A light-emitting diode (LED) 17 has a transparent lens portion 18, an upper conductor 19, and a lower conductor 20. Case 11 has a lighted end 21 which includes an LED supporting cavity 22. A weight member 23 has a hinge 24, a hinge arm 25, and a weight portion 26. An opening 27 permits the weight member 23 to be captured by fitting in a groove 28 in case 11 as shown best in FIG. 1 and FIGS. 4 and 5.

Figure 4:
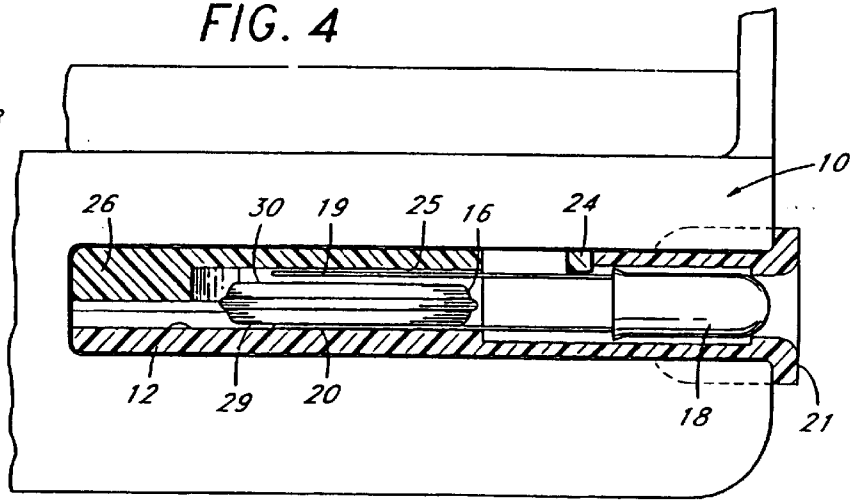
FIG. 4 is an enlarged cross-sectional view taken along line 4—4 of FIG. 1 with the LED off.
Figure 5:
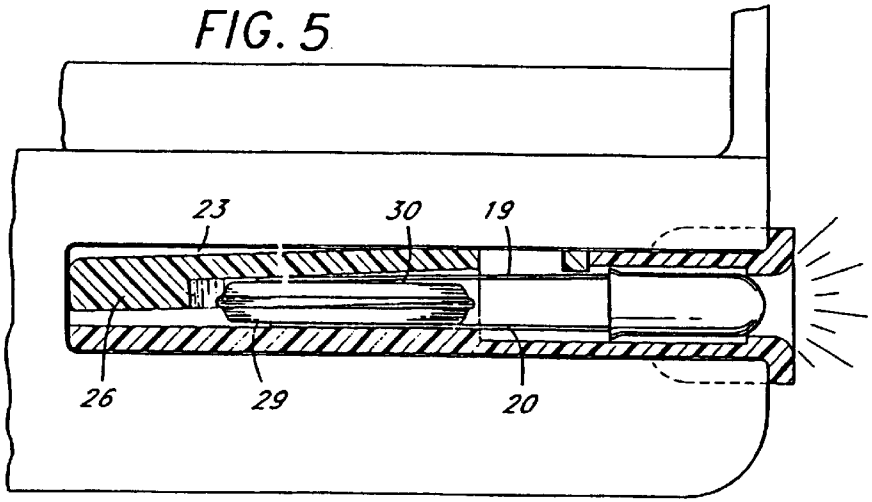

Turning now to FIG. 4, it can be seen that lower conductor 20 abuts floor 12 and also the negative terminal 29 of wafer battery 16. It is thus in continuous contact with the negative terminal 29. The upper conductor 19 is supported in a cantilevered manner from transparent lens portion 18 and is spaced away from positive terminal 30. The downward force of weight portion 26 is not sufficient to overcome the biased force of cantilevered upper conductor 19. However, when the module 10 is moved upwardly, (or its downward movement is stopped), the weight portion 26 moves downwardly by inertia as shown in FIG. 5. This causes the upper conductor 19 to make contact with the positive terminal 30. Since the lower conductor 20 is in continuous contact with the negative terminal 29, this causes the LED to light. When the inertial force ceases to move weight portion 26 downwardly, the biased force of cantilevered upper connector 19 returns the weight member 23 back to the position shown in FIG. 4 turning off the LED.

The resulting device is very economical to manufacture, automatically turns off when not in use and is highly reliable. While a hinged weight is shown in the drawings, the weight need not be hinged, and can be merely supported by the upper conductor 19 above the battery as, for instance, a cavity above the battery. The essential feature is the combination of a weight which at rest is insufficient to force the upper conductor down, but which is sufficient in movement by inertia to move the upper conductor into contact with the wafer battery.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An improved module of the type having a light emitting diode and a wafer battery held in a case which improved module provides intermittent light when moved up and down, said module comprising:

a case having a floor, two sides and a front comprising a lighted end and an LED supporting cavity at the lighted end thereof;

an LED held in said LED supporting cavity of said case, said LED having a transparent lens portion, an upper conductor and a lower conductor, said LED being supported in said case so that the lower conductor is adjacent said floor and the upper conductor is supported in a cantilevered manner from said transparent lens portion above said floor;

a wafer battery having a positive and a negative terminal on a first and second side thereof, said wafer battery being positioned in said case so that one of its positive and negative terminals continuously contacts the lower conductor of said LED and the upper conductor is positioned so that it is spaced from another of the negative and positive terminals of said wafer battery; and a weight manner held above the upper conductor of said LED, said weight member being captured by said case and resting on said upper terminal of said LED but said weight manner being permitted some movement so that the weight member moves downwardly by inertia as the module is moved upwardly from a rest position or when a downward movement of the module is stopped, and the downward inertia of the weight member forces the upper conductor of said LED downwardly into contact with the other of the negative and positive terminals of said wafer battery but said weight member and the upper conductor being selected so that the tendency of the upper conductor to bias itself away from the wafer battery will overcome the resting weight of the weight member so that the upper conductor will move away from the wafer battery when the module is at rest, whereby the LED will be lighted by the contact of the upper conductor with the wafer battery when the force of the downward inertia of the weight member overcomes the biased force of the upper conductor which urges the upper conductor away from the wafer battery.

2. The improved module of claim 1 wherein said weight member is a hinged weight member having a hinge portion positioned in said case between said lighted end and said wafer battery.

3. The improved module of claim 2 wherein said hinged weight member has an arm which extends over said wafer battery and in contact with said upper conductor and said arm extends past said wafer battery to a weight portion.

4. The improved module of claim 3 wherein said hinge portion is captured in a groove in said case near the lighted end thereof.

5. The improved module of claim 3 wherein said weight portion of said weight member extends from said arm of said hinge weight member downwardly toward the floor of said case.

6. The improved module of claim 1 wherein said case includes side walls extending upwardly from said floor and said side walls each has a groove which supports said wafer battery.

7. An improved module of the type having a light emitting diode and a wafer battery held in a case which improved module provides intermittent light when moved up and down, said module comprising:

a case having a floor, two side walls, a lighted end and an LED supporting cavity at the lighted end thereof;

an LED held in said LED supporting cavity of said case, said LED having a transparent lens portion, an upper conductor and a lower conductor, said LED being supported in said case so that the lower conductor is adjacent said floor and the upper conductor is supported in a cantilevered manner from said transparent lens portion above said floor;

a wafer battery having a positive and a negative terminal on a first and second side thereof, said wafer battery being held by said two side walls of said case and positioned so that one of its positive and negative terminals continuously contacts the lower conductor of said LED and the upper conductor is positioned so that it is spaced from another of the negative and positive terminals of said wafer battery; and a hinged weight member held by said case above the upper conductor of said LED, said hinged weight member having a hinge portion and a weight portion and an arm and said hinge portion being captured by said case but said weight portion of said hinged weight member being permitted some vertical movement so that when the module is moved upwardly from a rest position or when a downward movement of the module is stopped, the weight portion moves downwardly by the force of inertia, and said hinged weight member having a surface which contacts the upper conductor and the downward inertia of the weight portion will force the upper conductor of said LED into contact with the other of the negative and positive terminals of said wafer battery but said weight portion and the upper conductor being selected so that the tendency of the upper conductor to bias itself away from the wafer battery will overcome the resting weight portion of the weight member so that the upper conductor will move away from the wafer battery when the module is at rest, whereby the LED will be lighted by the contact of the upper conductor with the wafer battery when the force of downward inertia overcomes the biased force of the upper conductor which urges the upper conductor away from the wafer battery.

*8. Footwear having a lighting system that flashes on and off in response to inertial forces acting upon the footwear, comprising:*

*a flexible upper portion adapted to surround at least a portion of an upper surface of a wearer's foot:*

*a sole portion attached to the upper portion and adapted to underlie the wearer's foot and to contact the ground;*

*an electrical light source disposed in the footwear such that light emitted from the light source is visible exteriorly of the footwear;*

*a battery for powering the light source;*

*a base disposed within the footwear; and*

*an electrical circuit for electrically connecting the battery to the light source, the electrical circuit including a switch for causing the light source to flash on and off in response to inertial forces incident upon the footwear, said switch comprising:*

*an inertially responsive spring-mass system having one end mounted to the base and an opposite free end for intermittently electrically connecting the battery to the light source during a walking movement in response to an inertial force acting on the footwear;*

*wherein, in response to inertial forces on the footwear during walking, the spring-mass system moves alternately in a first direction to provide electrical connection between the battery and the light source, thereby switching the light source on, and in a second direction to electrically disconnect the battery from the light source, thereby switching the light source off.*

*9. The footwear of claim 8, wherein the spring-mass system is positioned such that, when the footwear is in an equilibrium position, the spring-mass system electrically disconnects the battery from the light source to switch the light source off.*

*10. The footwear of claim 8, wherein said light source includes at least one light emitting diode.*

*11. The footwear of claim 8, wherein said base includes a case having a cavity therein which holds the battery and the*

*light source, the cavity extending in a lengthwise direction generally parallel to a bottom of said case and said spring-mass system is mounted so as to extend in said lengthwise direction in a cantilevered manner in said cavity and moves in a direction generally perpendicular to said lengthwise direction in order to make an intermittent connection between said battery and said light source.*

*12. The footwear of claim 8, wherein when said footwear is in an equilibrium position, the spring-mass system electrically disconnects the battery from the light source, such that the light source is normally-off until an inertial force of sufficient magnitude is applied to the footwear to cause the spring-mass system to move to electrically connect the battery with the light source.*

*13. Footwear having a lighting system that flashes on and off in response to inertial forces acting upon the footwear, comprising:*

*a flexible upper portion adapted to surround at least a portion of an upper surface of a wearer's foot;*

*a sole portion attached to the upper portion and adapted to underlie the wearer's foot and to contact the ground;*

*a case positioned in said sole portion;*

*a light source held in said footwear such that light is viewable exteriorly of the footwear, said light source having a first conductor and a second conductor;*

*a battery having a positive terminal and a negative terminal, said battery being positioned in said case such that one of the positive and negative terminals is continuously electrically connected with the second conductor of said light source, with the first conductor being electrically disconnected from said other of the positive and negative terminals in an equilibrium position of said footwear;*

*an inertially responsive spring member mounted in said case for movement between a first position to provide electrical connection between the battery and the first conductor, thereby switching the light source on, and a second position to electrically disconnect the battery from the first conductor, thereby switching the light source off;*

*wherein, in response to inertial forces on the footwear during movement thereof, the spring member moves alternately in a first direction to provide electrical connection between the battery and the first conductor, thereby switching the light source on, and in a second direction to electrically disconnect the battery from the first conductor, thereby switching the light source off.*

*14. The footwear of claim 13, wherein the spring member is positioned such that, when the footwear is in an equilibrium position, the spring member provides that the battery is disconnected from the first conductor to switch the light source off.*

*15. The footwear of claim 13, wherein said case has a cavity therein which holds the battery and the light source, the cavity extending in a lengthwise direction generally parallel to a bottom of said case and said spring member is mounted so as to extend in said lengthwise direction in a cantilevered manner in said cavity and moves in a direction generally perpendicular to said lengthwise direction during movement of said footwear in order to provide intermittent electrical connection between said battery and said first conductor.*

*16. The footwear of claim 13, wherein when said footwear is in an equilibrium position, the spring member electrically disconnects the battery from the light source, such that the light source is normally off until an inertial force of sufficient magnitude is applied to the footwear to cause the spring member to move to electrically connect the battery with the light source.*

* * * * *

UNITED STATES PATENT AND TRADEMARK OFFICE

CERTIFICATE OF CORRECTION

PATENT NO. : RE 37, 220 E
DATED : June 12, 2001
INVENTOR(S) : Carmen C. Rapisarda et al.

It is certified that error appears in the above-identified patent and that said Letters Patent is hereby corrected as shown below:

Title page,
Insert: -- [73] Assignee: Carmen C. Rapisarda, Monrovia, California --

Signed and Sealed this

Thirty-first Day of December, 2002

JAMES E. ROGAN
*Director of the United States Patent and Trademark Office*